(12) United States Patent  
Doi

(10) Patent No.: US 8,411,381 B2  
(45) Date of Patent: Apr. 2, 2013

(54) LENS BARREL

(75) Inventor: Itaru Doi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/983,955

(22) Filed: Jan. 4, 2011

(65) Prior Publication Data

US 2011/0267711 A1    Nov. 3, 2011

(30) Foreign Application Priority Data

Jan. 6, 2010   (JP) ................................. 2010-000963

(51) Int. Cl.
*G02B 7/02* (2006.01)
*G02B 15/14* (2006.01)

(52) U.S. Cl. ........ 359/823; 359/824; 359/694; 353/101; 396/133

(58) Field of Classification Search .......... 359/822–826, 359/829, 830, 694–704; 353/100, 101; 396/63, 396/349, 448

See application file for complete search history.

(56) References Cited

U.S. PATENT DOCUMENTS

| 7,428,376 | B2 * | 9/2008 | Makii | 396/133 |
| 7,486,452 | B2 * | 2/2009 | Kinoshita et al. | 359/813 |
| 7,706,089 | B2 * | 4/2010 | Koc et al. | 359/824 |
| 7,710,668 | B2 * | 5/2010 | Shimizu et al. | 359/819 |
| 8,000,044 | B2 * | 8/2011 | Ono et al. | 359/824 |

FOREIGN PATENT DOCUMENTS

| JP | H8-248289 | 9/1996 |
| JP | 11-289743 A1 | 10/1999 |
| JP | 2000-275497 | 10/2000 |
| JP | 2004-170753 | 6/2004 |
| JP | 2007-25640 | 2/2007 |

* cited by examiner

*Primary Examiner* — Loha Ben
(74) *Attorney, Agent, or Firm* — Renner, Otto, Boisselle & Sklar, LLP

(57) ABSTRACT

A lens barrel includes a lens frame which is movable while supporting a lens; and a restriction portion configured to restrict movement of the lens frame by contacting the lens frame. The lens frame and the restriction portion contact each other at a plurality of points.

5 Claims, 8 Drawing Sheets

LENS BARREL

CROSS-REFERENCE TO RELATED APPLICATION

This application claims priority to Japanese Patent Application No. 2010-000963 filed on Jan. 6, 2010, the disclosure of which including the specification, the drawings, and the claims is hereby incorporated by reference in its entirety.

BACKGROUND

A technique disclosed herein relates to a lens barrel, and particularly relates to a lens barrel including lens frames therein.

In a conventional imaging apparatus, a lens system focuses light from an object on an imaging plane to form an image on the imaging plane, and such an image is taken as an object image. As lenses used for the lens system, there are various lenses such as zoom lenses, focus lenses, etc. Such lenses are accommodated in a lens barrel with the lenses being held by lens frames. The lens frames holding the zoom lens and the focus lens are movable inside the lend barrel, and are driven by hand or by an actuator (see, e.g., Japanese Patent Publication No. H11-289743). Thus, as the lens frames are moved, the lenses held by the lens frames move, thereby adjusting a focal length and a focal position.

SUMMARY

In a configuration in which the lens frame is moved inside the lens barrel, movement of the lens frame without restriction cannot be allowed, and it is necessary to specify a moving range of the lens frame so as to fall within a predetermined range. Typically, the movement of the lens frame is restricted by contacting the lens frame to a restriction portion formed by a member fixed inside the lend barrel.

However, in such a configuration, there is a problem that collision noise is caused when the lens frame contacts the restriction portion. Since an uncomfortable feeling is provided to a user, it is not preferable that the noise is caused during use of the imaging apparatus. For example, there is a possibility that the collision noise provides the user the uncomfortable feeling leading to a suspicion of a failure of the imaging apparatus.

The technique discloses herein has been made in view of the foregoing, and it is an objective of such a technique to reduce the collision noise between the lens frame and the restriction portion.

The technique disclosed herein is intended for a lens barrel including a lens frame which is movable while supporting a lens; and a restriction portion configured to restrict movement of the lens frame by contacting the lens frame. The lens frame and the restriction portion contact each other at a plurality of points.

According to such a configuration, even when the lens frame collides against the restriction portion, the lens frame and the restriction portion collide against each other at the plurality of points. Thus, collision energy is dispersed, thereby reducing collision noise in the entire lens barrel.

According to the lens barrel of the present disclosure, the collision noise between the lens frame and the restriction portion can be reduced.

DETAILED DESCRIPTION

Embodiments provided as examples will be described below in detail with reference to the drawings.

1. Summary of Lens Barrel

Figure 1:
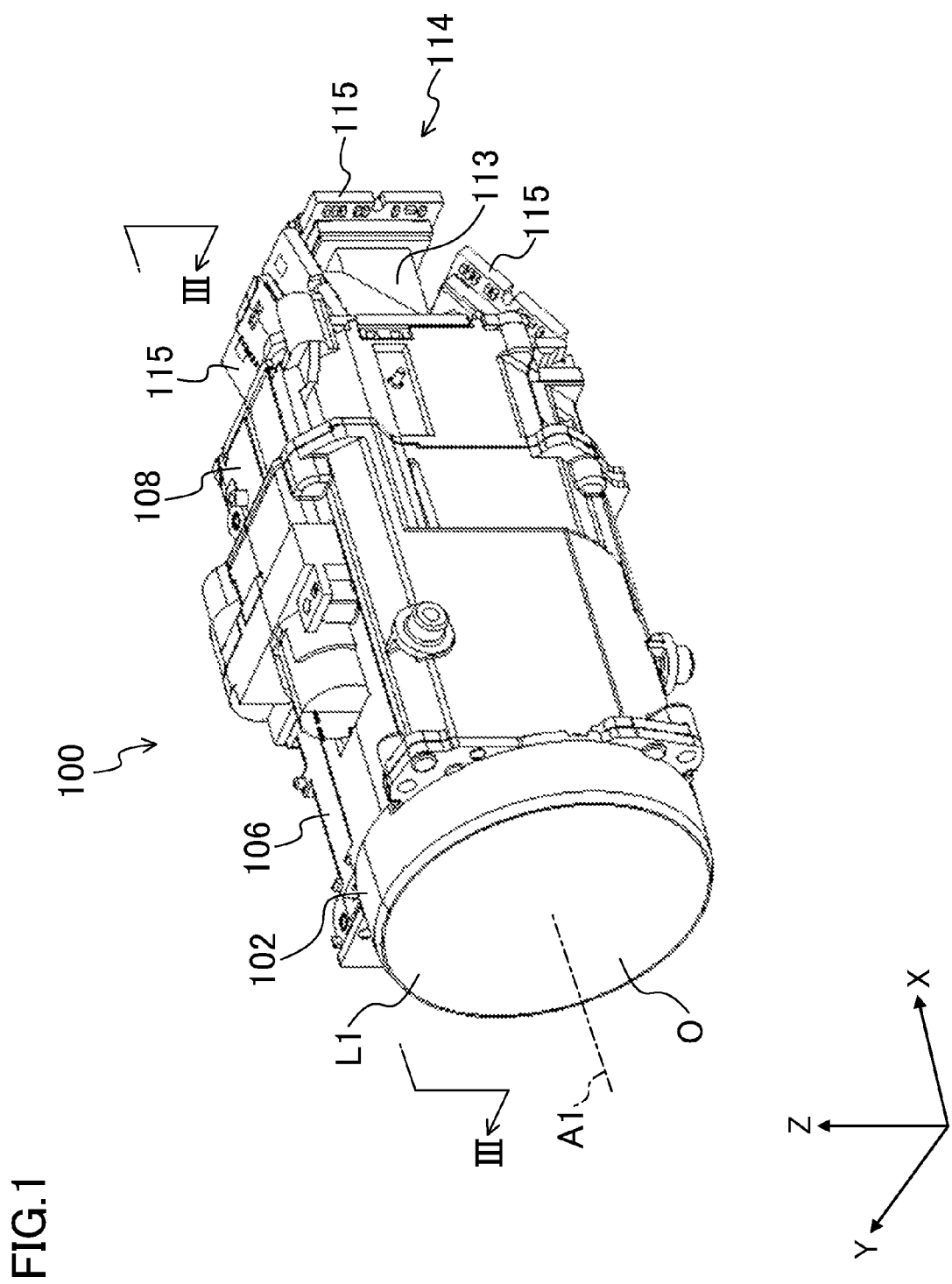
FIG. 1 is a perspective view of a lens barrel of an embodiment.
Figure 2:
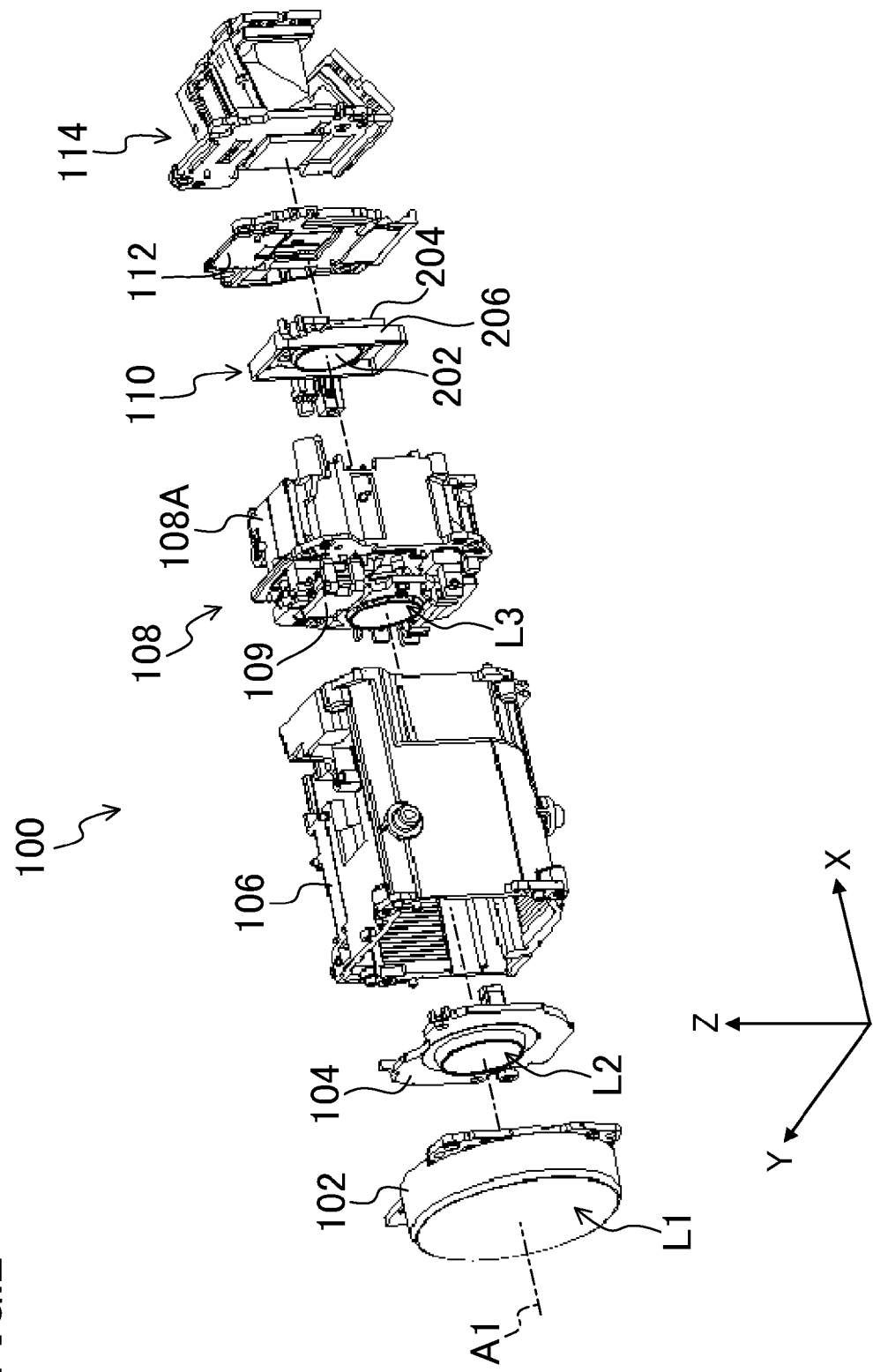
FIG. 2 is an exploded perspective view of the lens barrel.
Figure 3:
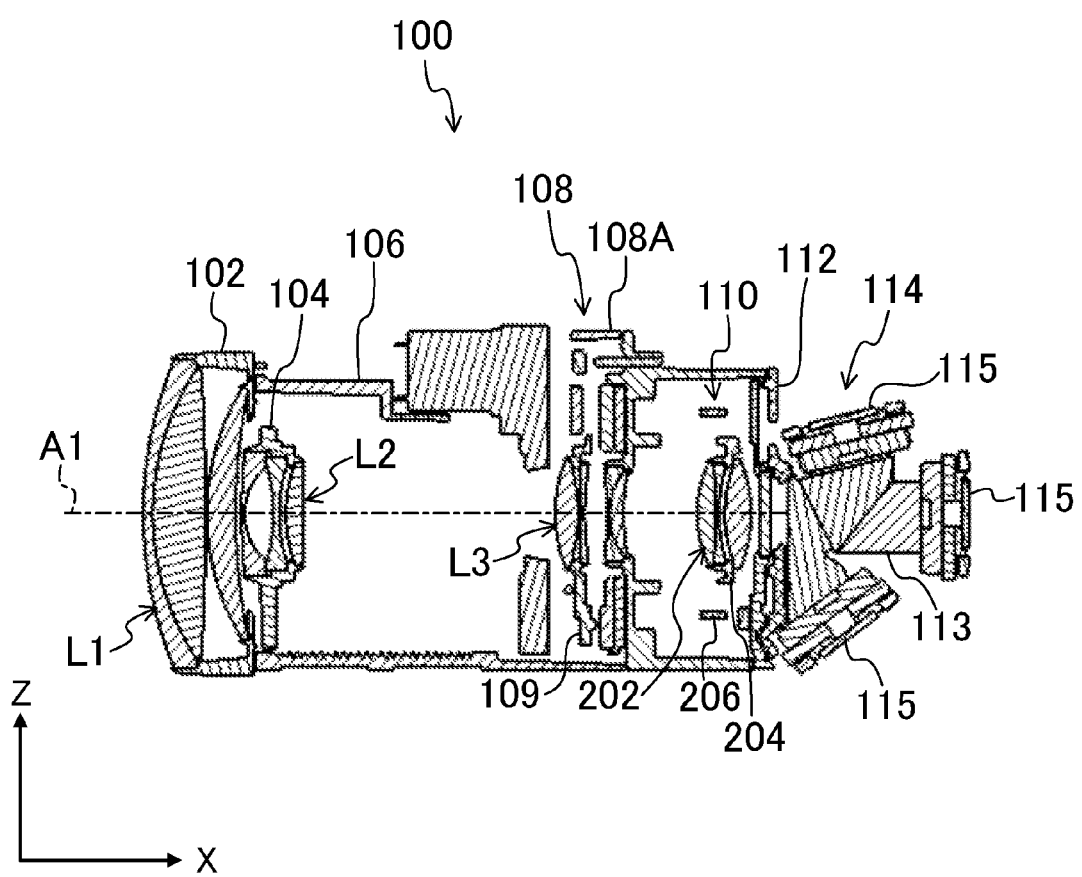
FIG. 3 is a cross-sectional view taken along an III-III line of FIG. 1.
Figure 4:
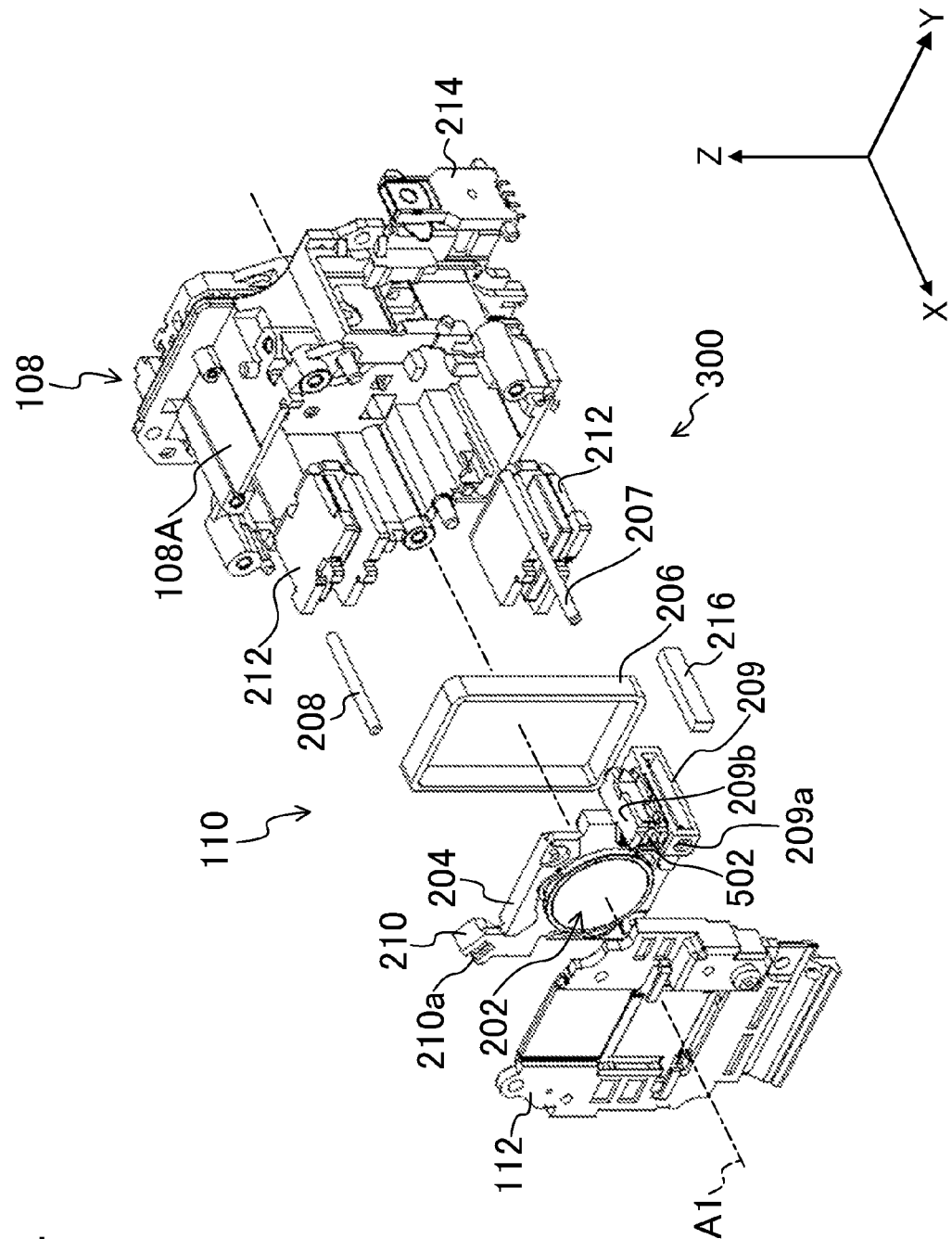
FIG. 4 is an exploded perspective view of a focusing unit.

FIG. 1 is a perspective view of a lens barrel of the present embodiment, FIG. 2 is an exploded perspective view of the lens barrel, and FIG. 3 is an III-III cross-sectional view of FIG. 1. In the present embodiment, a three-dimensional Cartesian coordinate system including X, Y, and Z axes is defined for convenience of description as illustrated in FIG. 1. In the drawings, the embodiments will be described below based on the X-Y-Z coordinate system. Arrows of the X, Y, and Z axes points in positive directions of such axes, and the pointing direction of each axis in one figure corresponds to those in the other figures. The X axis is coincident with an optical axis of a lens system. An imaging apparatus side to which the lens barrel is attached is a positive side, and an object side is a negative side. Note that the negative side in the X-axis direction may be referred to as a "front" side, and the positive side may be referred to as a "rear" side. The Y axis is coincident with a horizontal direction when the lens barrel is arranged to shoot a landscape image. When facing the object, the right side of the object is a positive side, and the left side of the object is a negative side. The Z axis is coincident with a vertical direction when the lens barrel is arranged to shoot the landscape image. An upper side is a positive side, and a lower side is a negative side.

As illustrated in FIGS. 1-3, a lens barrel 100 includes a lens system O, a first group frame 102, a second group frame 104, a body frame 106, an image stabilizing unit 108, a focusing unit 110, a cover unit 112, and a prism unit 114.

The lens system O forms an optical image of the object (hereinafter referred to as an "object image"). The lens system O is a zoom lens system in which a focal length is changeable. That is, in the lens system O, a zoom factor is changeable by changing the focal length. The lens system O includes a first lens group L1, a second lens group L2, a third lens group L3, and a focus lens group 202. Each of the first lens group L1, the second lens group L2, the third lens group L3, and the focus lens group 202 may be formed by a single lens, or a plurality of lenses.

The body frame 106 is a member to which the first group frame 102, the second group frame 104, the image stabilizing unit 108, etc. are attached. The body frame 106 is a tubular member made of, e.g., polycarbonate resin. The body frame 106 preferably has certain stiffness, and therefore may be made of metal material such as aluminum instead of polycarbonate resin.

The first group frame 102 is configured to hold the first lens group L1 formed by a plurality of lenses. The first group frame 102 is a frame-like member made of, e.g., polycarbonate resin. The first group frame 102 is attached to a front end portion of the body frame 106 (end portion on the negative side in the X-axis direction). Light from the object initially enters the first lens group L1.

The second group frame 104 is configured to hold the second lens group L2 formed by a plurality of lenses. The second group frame 104 is a frame-like member made of, e.g., polycarbonate resin. The second group frame 104 is held by the body frame 106 so as to move along an optical axis A1 inside the body frame 106. The lens of the second lens group L2 is a so-called zoom lens, and has a function to change the zoom factor of the lens system O. That is, the second group frame 104 moves in the optical axis A1 direction, thereby changing the zoom factor of the lens barrel 100. Specifically, when the second group frame 104 moves toward the first group frame 102 (the negative side in the X-axis direction), the zoom factor is decreased. On the other hand, when the second group frame 104 moves toward the image stabilizing unit 108 (the positive side in the X-axis direction), the zoom factor is increased.

The image stabilizing unit 108 has a function to correct wobble of light entering the prism unit 114 due to a shake of the lens barrel 100. The image stabilizing unit 108 includes a frame-like body portion 108A and a movable lens frame 109 attached to the body portion 108A. The movable lens frame 109 holds the third lens group L3 formed by a plurality of lenses. The movable lens frame 109 is a frame-like member made of, e.g., polycarbonate resin. The movable lens frame 109 is attached to a front surface of the body portion 108A so as to move in a plane perpendicular to the optical axis A1. The movable lens frame 109 is driven by a linear actuator (not shown in the figure), and moves in the plane perpendicular to the optical axis A1.

The focusing unit 110 has a function to adjust a focus of the object image. The focusing unit 110 is accommodated in the body portion 108A of the image stabilizing unit 108. The focusing unit 110 includes a focus lens frame 204 which is movable along the optical axis A1, a linear actuator 300 configured to drive the focus lens frame 204, and a MR sensor 214 configured to detect a position of the focus lens frame 204. The focus lens frame 204 is made of, e.g., polycarbonate resin. The focus lens frame 204 holds the focus lens group 202 formed by a plurality of lenses. The focus lens group 202 corresponds to a lens, and the focus lens frame 204 corresponds to a lens frame. A configuration of the focusing unit 110 will be described below in more detail.

The cover unit 112 is a plate-like member, and has an opening through which light passes at the center thereof. The cover unit 112 is made of polycarbonate resin. The cover unit 112 is attached to a rear end portion of the body portion 108A of the image stabilizing unit 108.

The prism unit 114 includes a prism 113 configured to separate incident light in three primary colors of red, blue, and green, and three imaging devices 115 arranged at exit surfaces of the prism 113. The prism 113 is arranged on a back surface of the cover unit 112. A CMOS sensor, a CCD sensor, etc. form the imaging device 115. The imaging device 115 receives light, i.e., the object image, and then converts the object image into electrical image signals.

2. Configuration of Focusing Unit 110

First, the linear actuator 300 will be described. The linear actuator 300 includes a coil 206 attached to the focus lens frame 204, first and second guide poles 207, 208 configured to guide the focus lens frame 204, and two magnets 212 configured to drive the focus lens frame 204.

The coil 206 is formed by winding copper wires around an iron core formed in rectangular frame-like shape. The coil 206 is attached to the focus lens frame 204 so that the center of the coil 206 is on the optical axis A1. The attached coil 206 surrounds the focus lens frame 204.

Figure 6:
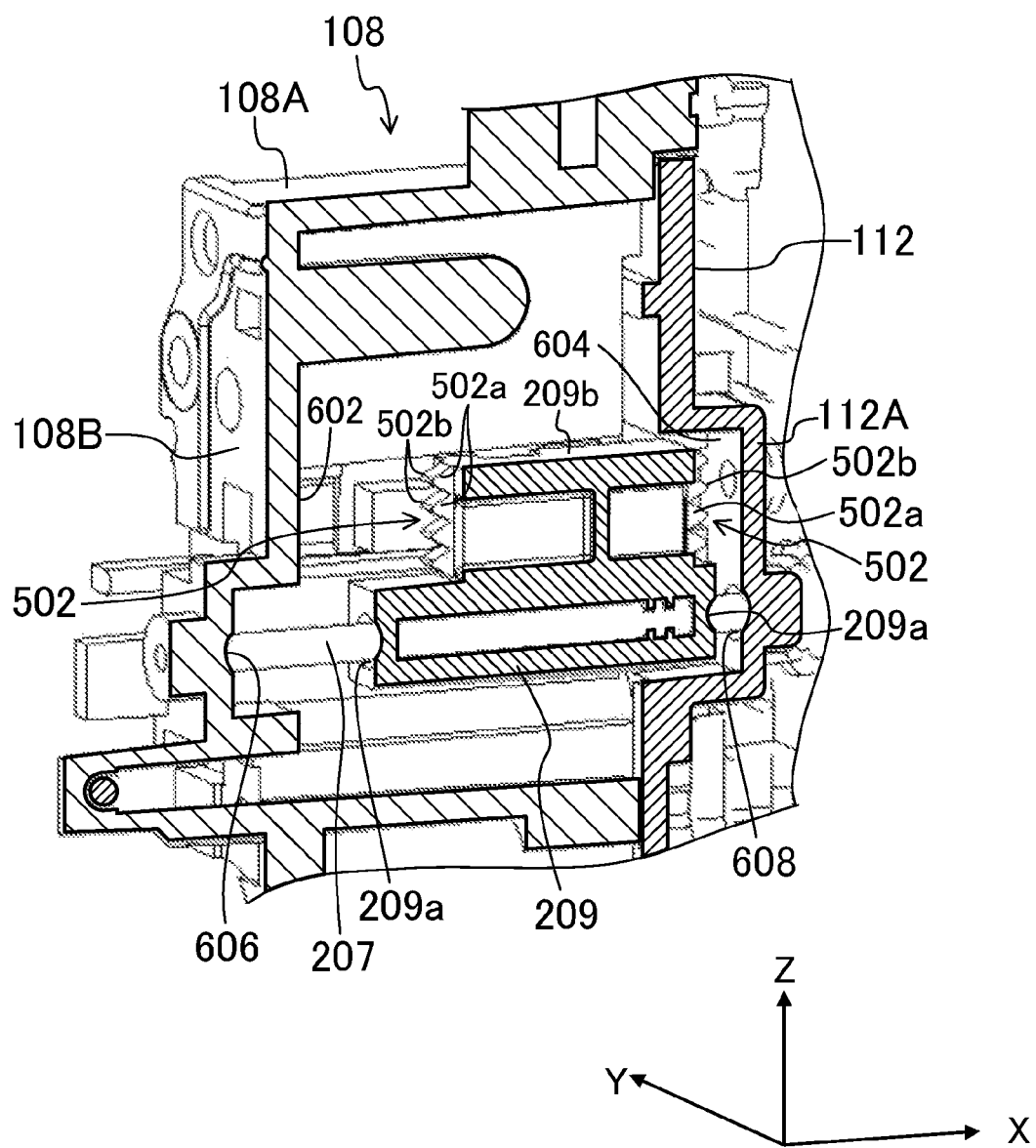
FIG. 6 is a partial cross-sectional view of the main portions of the lens frame.

The first and second guide poles 207, 208 are made of metal material such as stainless. The first and second guide poles 207, 208 are arranged parallel to the optical axis A1 in a rear portion of the body portion 108A of the image stabilizing unit 108. Specifically, as illustrated in FIG. 6, one end portion of the first guide pole 207 is fitted into an attachment hole 606 formed in the body portion 108A. The other end portion of the first guide pole 207 is fitted into an attachment hole 608 formed in the cover unit 112. Similarly, although not shown in the figure, one end portion of the second guide pole 208 is fitted into an attachment hole formed in the body portion 108A, and the other end portion of the second guide pole 208 is fitted into an attachment hole formed in the cover unit 112.

The magnets 212 are arranged above and below the focus lens frame 204 in the body portion 108A of the image stabilizing unit 108.

Next, the focus lens frame 204 will be described in detail. The focus lens frame 204 is formed in frame-like shape as a whole by forming a substantially circular opening at the center of a substantially square plate-like member. The focus lens group 202 is fitted into the opening at the center of the focus lens frame 204.

The focus lens frame 204 includes first and second bearing portions 209, 210 fitted onto the first and second guide poles 207, 208. The first and second bearing portions 209, 210 are arranged in opposite positions with the optical axis A1 being interposed therebetween. Specifically, the first and second bearing portions 209, 210 are provided in diagonal positions of the square focus lens frame 204. The first bearing portion 209 is formed as a tubular member having a rectangular cross section (note that one of four side surfaces is opened). Circular openings 209a are formed so as to penetrate wall portions provided at both ends of the tubular member. The first guide pole 207 is inserted into the openings 209a. The second bearing portion 210 is formed in bifurcated shape having a slit 210a. Specifically, the slit 210a is formed so as to be cut from an outside of the focus lens frame 204 toward the opening provided at the center of the focus lens frame 204. The second guide pole 208 is inserted into the slit 210a. The focus lens frame 204 is guided by the first and second bearing portions 209, 210 and the first and second guide poles 207, 208, thereby moving in the optical axis A1 direction. In such a state, movement of the focus lens frame 204 in a radial direction around the first guide pole 207 is restricted by the first bearing portion 209 and the first guide pole 207, and rotation of the focus lens frame 204 about the first guide pole 207 is restricted by the second bearing portion 210 and the second guide pole 208.

A sensor magnet 216 is provided in the focus lens frame 204. The MR sensor 214 is provided in the body portion 108A of the image stabilizing unit 108. The MR sensor 214 detects the sensor magnet 216, thereby detecting a relative position of the focus lens frame 204. Specifically, the sensor magnet 216 is formed in rectangular parallelepiped shape, and is magnetized in order of N-S-N-S in the optical axis A1 direction from the first group frame 102 side. Note that the sensor magnet 216 may be magnetized in order of S-N-S-N from the first group frame 102 side. The sensor magnet 216 is attached to an attachment portion 209b provided on the first bearing portion 209 (on the positive side in the Z-axis direction). The MR sensor 214 detects magnetic field of the sensor magnet 216, and outputs electrical signals corresponding to the magnetic field. The relative position of the focus lens frame 204 can be detected based on the electrical signals. The MR sensor 214 serves as a relative position detecting unit.

3. Operation of Focusing Unit

The focusing unit 110 is driven by the linear actuator 300. Specifically, when current flows through the coil 206 fixed to the focus lens frame 204, a magnetic field is produced in the optical axis A1 direction. Then, attractive force or repulsive force is generated between the coil 206 and the drive magnet 212. Consequently, the focusing unit 110 including the focus lens frame 204 moves back and forth along the optical axis A1 while being guided by the first guide pole 207 and the second guide pole 208.

In such a state, the MR sensor 214 outputs signals corresponding to the position of the focus lens frame 204. The relative position of the focus lens frame 204 can be specified based on such output signals.

4. Configuration of Contact Portion

In the focusing unit 110 configured as described above, the focus lens frame 204 contacts either one of the body portion 108A of the image stabilizing unit 108 and the cover unit 112, resulting in restriction of the movement of the focus lens frame 204 in the optical axis A1 direction. Specifically, first and second contact portions 502 are provided in the focus lens frame 204. A first restriction portion 602 contacting the first contact portion 502 is provided in the body portion 108A of the image stabilizing unit 108, and a second restriction portion 604 contacting the second contact portion 502 is provided in the cover unit 112.

Figure 5:
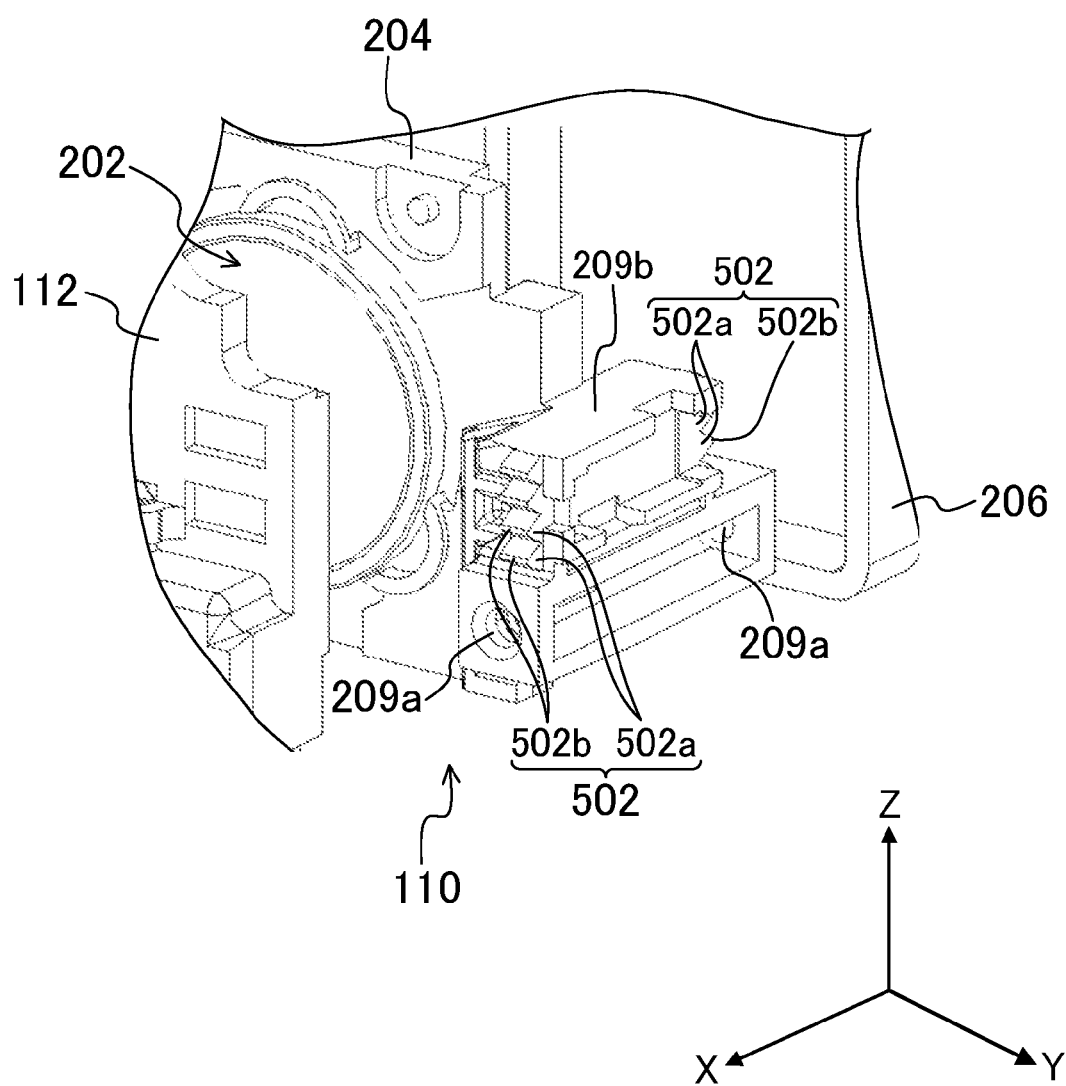
FIG. 5 is an enlarged perspective view of main portions of a lens frame.

As illustrated in FIG. 5, the first and second contact portions 502 are provided in the attachment portion 209b of the focus lens frame 204, to which the sensor magnet 216 is attached. Specifically, the first contact portion 502 is provided in a front end portion of the attachment portion 209b, and the second contact portion 502 is provided in a rear end portion of the attachment portion 209b.

The first and second contact portions 502 have the same shape. Thus, only the shape of the first contact portion 502 will be described, and description of the second contact portion 502 will not be repeated. The first contact portion 502 includes four raised portions 502a, and is formed so as to have a sawtooth-like cross section. The raised portion 502a is formed in triangular pole shape, and the raised portions 502a are arranged in the Z-axis direction so that the axes of the raised portions 502a are parallel to the Y-axis direction. In such a state, one side surface of three side surfaces of the triangular pole of the raised portion 502a faces the attachment portion 209b side, whereas a ridge portion 502b opposite to the one side surface points at a side opposite to the attachment portion 209b, i.e., an outside. The four ridge portions 502b of the four raised portions 502a, which point at the side opposite to the attachment portion 209b are positioned on the same plane perpendicular to the optical axis A1. Note that round chamfering (R-chamfering) is applied to each of the ridge portions 502b. The first and second contact portions 502 configured as described above are made of polycarbonate resin by using a mold.

The first restriction portion 602 is provided in a wall portion 108B of the body portion 108A, which has wall surfaces facing the optical axis A1 direction. A part of the wall portion 108B, which contacts the first contact portion 502 corresponds to the first restriction portion 602.

The second restriction portion 604 is provided in a wall portion 112A of the cover unit 112, which has wall surfaces facing the optical axis A1 direction. A part of the wall portion 112A, which contacts the second contact portion 502 corresponds to the second restriction portion 604.

That is, when the focus lens frame 204 moves to the front side (negative side in the X-axis direction), the contact portion 502 eventually contacts the first restriction portion 602, and the focus lens frame 204 cannot further move to the front side. On the other hand, when the focus lens frame 204 moves to the rear side (positive side in the X-axis direction), the contact portion 502 eventually contacts the second restriction portion 604, and the focus lens frame 204 cannot further move to the rear side.

When current is not applied to the coil 206 (e.g., when the imaging apparatus is turned off), holding force does not act on the focus lens frame 204, and therefore the focus lens frame 204 can freely move along the optical axis A1. That is, the focus lens frame 204 moves along the optical axis A1 by gravity or inertia force. Even in such a configuration, the first and second restriction portions 602, 604 are provided, thereby restricting the movement of the focus lens frame 204. Consequently, a moving range of the focus lens frame 204 can be limited.

The first contact portion 502 and the first restriction portion 602 are configured to contact each other at a plurality of points. In addition, the second contact portion 502 and the second restriction portion 604 are configured to contact each other at a plurality of points. Specifically, the first contact portion 502 contacts the first restriction portion 602 at the four ridge portions 502b. In addition, the second contact portion 502 contacts the second restriction portion 604 at the four ridge portions 502b. In such a manner, collision energy when the first contact portion 502 collides against the first restriction portion 602, or collision energy when the second contact portion 502 collides against the second restriction portion 604 is dispersed to the plurality of raised portions 502a, thereby reducing collision noise.

In the present embodiment, the sensor configured to detect the relative position of the focus lens frame 204 is used for detecting the position of the focus lens frame 204, and therefore it is necessary to accurately specify a reference position (e.g., an origin) of the focus lens frame 204. Particularly, in the present embodiment, when current is not applied to the coil 206, the focus lens frame 204 can freely move. Thus, it is necessary to specify the reference position of the focus lens frame 204 every time current is applied.

For the foregoing reason, in the present embodiment, when the lens barrel 100 is turned on, the focus lens frame 204 is first moved until the first contact portion 502 contacts the first restriction portion 602. At this point, an output from the MR sensor 214 is temporarily stored in a memory (not shown in the figure) as position information. Next, the focus lens frame 204 is moved until the second contact portion 502 contacts the second restriction portion 604. At this point, an output from the MR sensor 214 is temporarily stored in the memory (not shown in the figure) as position information. Subsequently, the position information temporarily stored in the memory (not shown in the figure) is sent to a computing device (not shown in the figure). The computing device calculates an average value of the position information to obtain a middle point between the position where the first contact portion 502 contacts the first restriction portion 602 and the position where the second contact portion 502 contacts the second restriction portion 604. Then, such a middle point is regarded as an origin of the focusing unit 110. The movement of the focus lens frame 204 is controlled based on the origin obtained as described above.

The first and second contact portions 502 and the first and second restriction portions 602, 604 are made of material having relatively high stiffness (e.g., polycarbonate resin). Thus, the position where the first contact portion 502 contacts the first restriction portion 602 and the position where the second contact portion 502 contacts the second restriction portion 604 are stabilized. Consequently, accuracy of the origin of the focus lens frame 204, which is obtained based on such contact positions is increased, and therefore accuracy of the position detection of the focus lens frame 204 is increased.

5. Conclusion

The lens barrel 100 of the present embodiment includes the focus lens frame 204 which is movable while holding the focus lens group 202, and the first and second restriction portions 602, 604 configured to restrict the movement of the focus lens frame 204 by contacting the focus lens frame 204. The first or second contact portion 502 of the focus lens frame 204 and the first or second restriction portion 602, 604 contact each other at the plurality of points.

According to the foregoing configuration, each of the contact portions 502 is divided, and therefore the first or second contact portion 502 and the first or second restriction portion 602, 604 collide against each other at the plurality of points. In such a manner, the collision energy is dispersed, thereby reducing the collision noise. Specifically, each of the contact portions 502 is divided into the plurality of raised portions 502a, and therefore energy dispersed to the plurality of raised portions 502a is less likely to be superposed and is likely to be dispersed as it is. That is, vibration of the restriction portion due to the collision energy is reduced. Thus, the collision noise is reduced as compared to a case where collision energy is simply received by a broader area.

In such a state, the first or second contact portion 502 and the first or second restriction portion 602, 604 are in line contact with each other at the plurality of points. Thus, the collision energy is further dispersed, thereby further reducing the collision noise.

Further, each of the contact portions 502 is divided into the plurality of raised portions 502a. Thus, when the first or second contact portion 502 contacts the first or second restriction portion 602, 604, the raised portions 502a are different from each other in timing at which the raised portion 502a contacts the first or second restriction portion 602, 604. This also reduces the collision noise. That is, the plurality of ridge portions 502b of each of the contact portions 502 are arranged on the same plane perpendicular to the optical axis A1, i.e., on the plane parallel to the first and second restriction portions 602, 604. However, due to backlash between each of the first and second bearing portions 209, 210 and each of the first and second guide poles 207, 208, and a shape error of the image stabilizing unit 108 and the focusing unit 110, the plurality of ridge portions 502b may not simultaneously contact the first or second restriction portion 602, 604. That is, one of the ridge portions 502b first contacts the first or second restriction portion 602, 604, and the remaining ridge portions 502b subsequently contact the first or second restriction portion 602, 604. When each of the plurality of ridge portions 502b and the first or second restriction portion 602, 604 contact each other at the different timing as in the foregoing, the collision energy is divided and transmitted from the first or second contact portion 502 to the first or second restriction portion 602, 604 at the different timing, thereby reducing the collision noise.

Only considering the reduction of the collision noise, an elastic member such as sponge and elastomer may be provided in the first or second contact portion 502 or in the first or second restriction portion 602, 604. However, in the present embodiment, the position where each of the first and second contact portions 502 and each of the first and second restriction portions 602, 604 contact each other is used as the reference for the calculation of the original position of the focus lens frame 204. The elastic member is provided as described above, resulting in variation in the original position of the focus lens frame 204. Thus, it is necessary that the first and second contact portions 502 and the first and second restriction portions 602, 604 are formed by a member having relatively-high stiffness. However, if the member having high stiffness is used, the collision noise between the contact portion 502 and each of the first and second restriction portions 602, 604 becomes louder. Therefore, in the present embodiment, the member having relatively-high stiffness is used for the first and second contact portions 502 and the first and second restriction portions 602, 604, and the first or second contact portion 502 and the first or second restriction portion 602, 604 contact each other at the plurality of points. This realizes both of improvement of the accuracy of the position detection of the focus lens frame 204 and reduction of the collision noise.

The first or second contact portion 502 is provided near the first or second bearing portion 209, 210. Thus, when the first or second contact portion 502 and the first or second restriction portion 602, 604 collide against each other, unnecessary force acting on the first and second bearing portions 209, 210 or the first and second guide poles 207, 208 can be reduced. In the present embodiment, the first and second contact portions 502 are provided above the first bearing portion 209.

In view of the foregoing, the first and second contact portions 502 may be provided in wall portions of the first bearing portion 209, where the openings 209a are provided (i.e., the wall portions through which the first guide pole 207 is inserted). However, in such a configuration, the first or second contact portion 502 contacts the wall portion of the body portion 108A of the image stabilizing unit 108 near the attachment hole 606, or the wall portion of the cover unit 112 near the attachment hole 608. Considering the accurate determination of the original position of the focus lens frame 204, the first and second restriction portions 602, 604 are preferably provided in portions with less distortion. However, there is a possibility that the wall portion near the attachment hole 606 or the wall portion near the attachment hole 608 is distorted due to the insertion of the first guide pole 207. For such distortion, the contact portion 502 is provided at the side surface of the first bearing portion 209 as described above, and therefore the first and second restriction portions 602, 604 can be provided apart from the attachment holes 606, 608. That is, in addition to the reduction of the unnecessary force acting on the first and second bearing portions 209, 210 or the first and second guide poles 207, 208, the accuracy of the position detection of the focus lens frame 204 can be improved.

Other Embodiments

The foregoing embodiment may have the following configurations.

For example, in the foregoing embodiment, the present disclosure is applied to the focusing unit 110 in the lens barrel 100, but is not limited to such a configuration. The present disclosure may be applied to, e.g., the second group frame 104. Alternatively, the present disclosure may be applied to the image stabilizing unit 108. In, e.g., the image stabilizing unit 108, a guide pin is provided in the body portion 108A, and a guide groove or a guide hole to be engaged with the guide pin is provided in the movable lens frame 109. The movable lens frame 109 is movable in the plane perpendicular to the optical axis A1 within a range in which the guide pin can relatively move in the guide groove or the guide hole. In the body portion 108A, restriction portions may be provided on four sides of the movable lens frame 109, i.e., the positive and negative sides in the Y-axis direction and the positive and negative sides in the Z-axis direction in the movable lens frame 109 so that movement of the movable lens frame 109 toward the positive and negative sides in the Y-axis direction and the positive and negative sides in the Z-axis direction is restricted. A shape of the restriction portion may be a block-like shape or a plate-like shape. The contact portion 502 can be provided in a portion of the movable lens frame 109, which contacts the restriction portion. This allows the movable lens frame 109 to contact the restriction portion at a plurality of points. Alternatively, in an inner circumferential surface of the guide groove or the guide hole, a plurality of raised streaks extending in a circumferential direction may be provided so as to be arranged in a longitudinal direction of the guide pin. In such a case, the guide pin functions as the restriction portion, and the movable lens frame 109 and the guide pin contact each other at the plurality of points through the plurality of raised streaks.

In the foregoing embodiment, the focus lens frame 204 is driven by the linear actuator 300, but the drive unit is not limited to the linear actuator 300. For example, the drive unit may be a motor such as a stepper motor, or an ultrasonic actuator formed by piezoelectric elements. Further, the present disclosure may be applied to a lens barrel in which a user rotates an operation ring to move a lens frame. Note that, if the motor is used, a control unit configured to control the motor serves as the relative position detecting unit configured to detect the relative position of the focus lens frame 204. For example, the control unit counts the pulse number of a signal driving the motor, thereby detecting a moving distance, i.e., a relative position of the focus lens frame 204.

The number of the raised portions 502a forming each of the first and second contact portions 502 is not limited to four. The number of the raised portions may be two, three, or more than five. However, in order to disperse the collision energy, more raised portions to be collided are preferably provided.

The shape of the raised portion 502a is not limited to the triangular pole. The raised portion may be formed in cylindrical column or semicircular column. Further, the raised portion may be formed in shapes illustrated in FIGS. 7 and 8.

Figure 7:
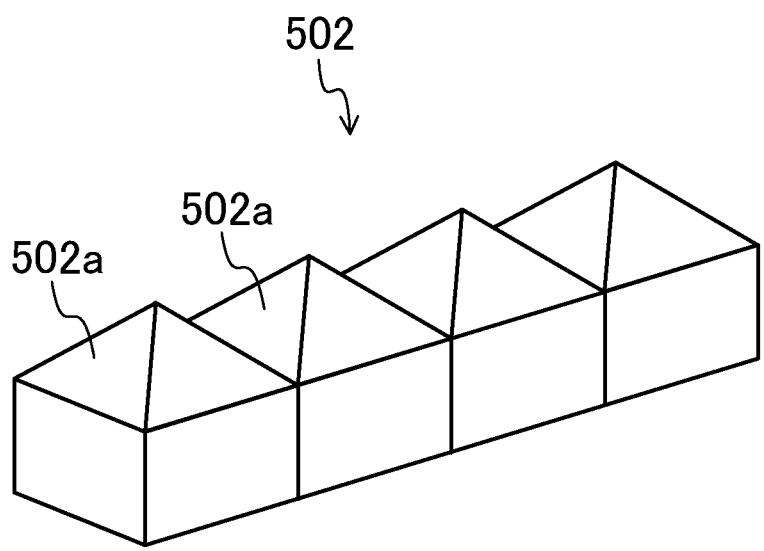
FIG. 7 is a perspective view illustrating a restriction portion of a variation.

That is, as illustrated in FIG. 7, the raised portion 502a may be formed in cone shape. In such a configuration, a top of the cone contacts the first or second restriction portion 602, 604. If the contact portion 502 is in point contact with the first or second restriction portion 602, 604 as described above, the collision energy is further dispersed as compared to the case of the line contact, thereby further reducing the collision noise.

Figure 8:
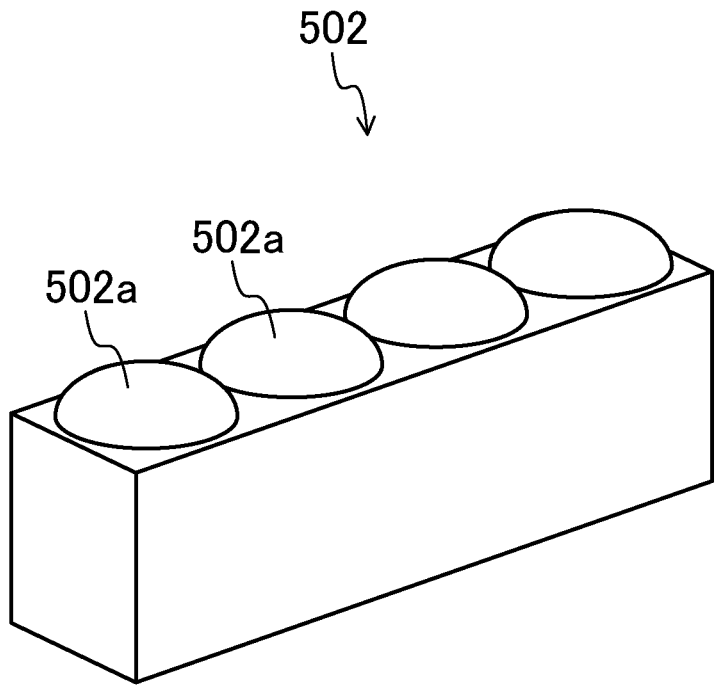
FIG. 8 is a perspective view illustrating a restriction portion of another variation.

As illustrated in FIG. 8, the raised portion 502a may be formed in, e.g., dome shape such as a hemispherical shape. In such a configuration, a top of the dome contacts the first or second restriction portion 602, 604. In such a case, the contact portion 502 is in point contact with the first or second restriction portion 602, 604 as in the cone, thereby further reducing the collision noise. In addition, abrasion resistance of the raised portion 502a can be improved as compared to the cone.

The shape of the raised portion 502a may be formed in any shapes as long as the first or second contact portion 502 and the first or second restriction portion 602, 604 can contact each other at the plurality of points.

Figure 9:
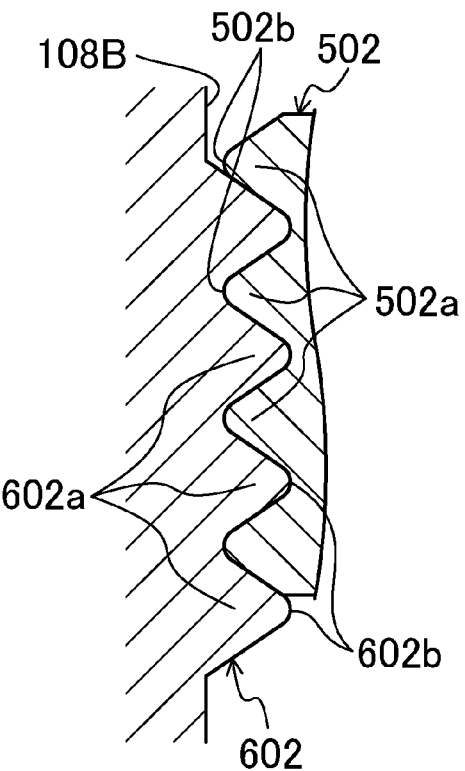
FIG. 9 is a schematic view illustrating a contact portion and a restriction portion in other embodiment.
Figure 10:
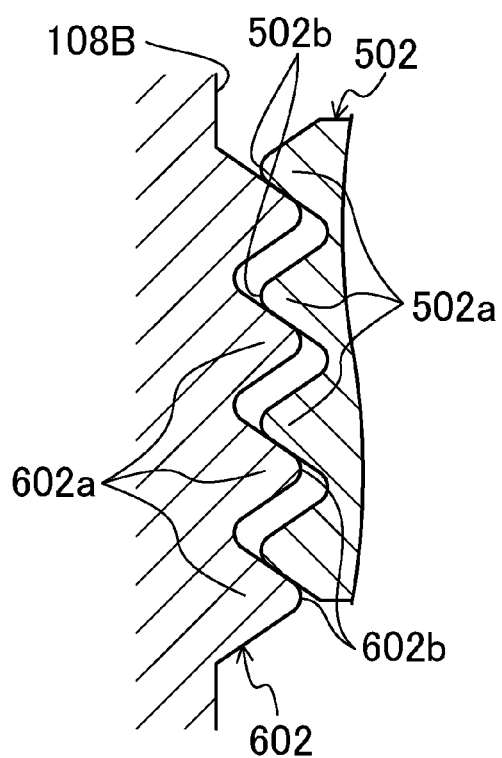
FIG. 10 is a schematic view illustrating a state in which the contact portion and the restriction is not fully engaged with each other in the other embodiment.

In the foregoing embodiment, the first or second contact portion 502 of the focus lens frame 204 is divided into the plurality of portions, but the present disclosure is not limited to such a configuration. For example, each of the first and second restriction portions 602, 604 may be divided into a plurality of portions, i.e., may have a plurality of raised portions. As illustrated in, e.g., FIG. 9, each of the first and second restriction portions 602, 604 may have a plurality of raised portions as in each of the first and second contact portions 502 (only the first restriction portion 602 is illustrated in FIG. 9). Specifically, as in the contact portion 502, the first restriction portion 602 has four raised portions 602a, and is formed so as to have a sawtooth-like cross section. The four raised portions 602a of the first restriction portion 602 and the four raised portions 502a of the contact portion 502 are formed so as to be engaged with each other, and are arranged in an engageable position. That is, when the contact portion 502 contacts the first restriction portion 602, the four raised portions 502a and the four raised portions 602a are engaged with each other. In such a state, two inclined surfaces of each of the raised portions 502a and two inclined surfaces of each of the raised portions 602a contact each other. Further, the ridge portion 502b of the raised portion 502a and a valley portion between the two raised portions 602a contact each other, and a ridge portion 602b of the raised portion 602a and a valley portion between the two raised portions 502a contact each other. In such a configuration, the first or second contact portion 502 and the first or second restriction portion 602, 604 also contact each other at a plurality of points.

In the configuration in which the contact portion 502 and the first or second restriction portion 602, 604 are engaged with each other as described above, the accuracy of the position detection of the focus lens frame 204 can be improved. That is, at the moment when the contact portion 502 and the first or second restriction portion 602, 604 contact each other, the contact portion 502 and the first or second restriction portion 602, 604 may not be fully engaged with each other due to the backlash between each of the first and second bearing portions 209, 210 and each of the first and second guide poles 207, 208. However, the focus lens frame 204 is not stopped in such a state, and the inclined surfaces of the raised portions 502a and the inclined surfaces of the raised portions 602a slide against each other. Eventually, the contact portion 502 and the first or second restriction portion 602, 604 are engaged with each other. Consequently, reproducibility of the position of the focus lens frame 204 when the contact portion 502 contacts each of the first and second restriction portions 602, 604 is increased, thereby accurately specifying the reference position of the focus lens frame 204. This improves the accuracy of the position detection of the focus lens frame 204.

The contact portions 502 are provided in the attachment portion 209b of the first bearing portion 209, but the present disclosure is not limited to such a configuration. The contact portion 502 may be provided in any portions as long as the contact portion 502 is integrally provided with the focus lens frame 204. If necessary, the position of each of the first and second restriction portions 602, 604 may be changed depending on the position of the contact portion of the focus lens frame 204.

In the present embodiment, the contact portions 502 and the first and second restriction portions 602, 604 are provided so that the movement of the focus lens frame 204 to both sides in the moving direction of the focus lens frame 204 is restricted, but the present disclosure is not limited to such a configuration. For example, a configuration may be employed, in which a reference position of the focus lens frame 204 is determined based on a position where the contact portion and the restriction portion contact each other on one side in the moving direction of the focus lens frame 204. In such a configuration, the contact portion and the restriction portion may be provided only on the one side in the moving direction. On the other side in the moving direction, an elastic body such as sponge and elastomer may restrict the movement of the focus lens frame 204.

In the foregoing embodiment, the MR sensor 214 is employed as the relative position detecting unit, but the present disclosure is not limited to such a configuration. For example, a sensor using hall elements or a light detecting sensor including, e.g., a laser transmitter and a receiver may be used as the relative position detecting unit.

In the foregoing embodiment, the prism unit 114 and the three imaging devices 115 arranged at the exit surfaces of the prism 113 are employed as the unit configured to convert the object image into the image signals containing the color information, but the present disclosure is not limited to such a configuration. For example, a configuration may be employed, in which a single color imaging device receives light without separating incident light by the prism. Alternatively, a configuration in which a single imaging device receives light without dispersing incident light may be employed as a unit configured to convert the object image into image signals containing only brightness information.

As described above, the technique disclosed herein relates to the lens barrel, and is particularly useful for the lens frame arranged inside the lens barrel.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A lens barrel, comprising:
   a lens frame which is movable while supporting a lens;
   a drive unit configured to drive the lens frame and to allow the lens frame to be in a non-holding state when current is not applied; and
   a restriction portion configured to, when current is not applied to the drive unit, restrict movement of the lens frame within a predetermined moving range by contacting the lens frame,
   wherein the restriction portion does not contact the lens frame except at ends of the moving range, and comes into contact with the lens frame at a plurality of points when the lens frame moves to one of the ends of the moving range.

2. The lens barrel of claim 1, wherein
   the lens frame is movable along a predetermined moving direction, and
   the restriction portion is provided on each side in the moving direction.

3. The lens barrel of claim 1, further comprising:
   a relative position detecting unit configured to detect a relative position of the lens.

4. The lens barrel of claim 1, wherein
   the lens frame and the restriction portion are in line contact with each other at the plurality of points.

5. The lens barrel of claim 1, wherein
   the lens frame and the restriction portion are in point contact with each other at the plurality of points.

* * * * *